(12) United States Patent
Vankamamidi et al.

(10) Patent No.: US 12,056,373 B1
(45) Date of Patent: Aug. 6, 2024

(54) DATA TIERING SYSTEM AND METHOD

(71) Applicant: Dell Products L.P., Round Rock, TX (US)

(72) Inventors: Vamsi K. Vankamamidi, Hopkinton, MA (US); Bruce E. Caram, Hudson, MA (US); Ajay Karri, South Grafton, MA (US); Alexei Karaban, Northborough, MA (US)

(73) Assignee: Dell Products L.P., Round Rock, TX (US)

( * ) Notice: Subject to any disclaimer, the term of this patent is extended or adjusted under 35 U.S.C. 154(b) by 7 days.

(21) Appl. No.: 18/160,705

(22) Filed: Jan. 27, 2023

(51) Int. Cl.
*G06F 3/06* (2006.01)

(52) U.S. Cl.
CPC .......... *G06F 3/0631* (2013.01); *G06F 3/0607* (2013.01); *G06F 3/0685* (2013.01)

(58) Field of Classification Search
CPC .... G06F 3/0629; G06F 3/0631; G06F 3/0644; G06F 3/0665; G06F 12/0223; G06F 12/023; G06F 12/0238; G06F 12/02; G06F 9/5016; G06F 9/5061; G06F 3/06
See application file for complete search history.

(56) References Cited

U.S. PATENT DOCUMENTS

| 6,609,187 B1 * | 8/2003 | Merrell | ................. G06F 3/0644 |
| | | | 711/E12.008 |
| 2016/0269537 A1 * | 9/2016 | Gandhi | .................. H04W 4/50 |

\* cited by examiner

*Primary Examiner* — Khoa D Doan
(74) *Attorney, Agent, or Firm* — Brian J. Colandreo; Heath M. Sargeant; Holland & Knight LLP

(57) ABSTRACT

A method, computer program product, and computing system for compartmentalizing a SSD storage tier within a storage platform into a plurality of SSD portions including a first SSD portion, a second SSD portion and a third SSD portion; reducing the size of the third SSD portion if the first SSD portion and/or the second SS portion needs to expand; and reducing the size of the second SSD portion if the first SSD portion needs to expand; wherein the storage platform includes an HDD storage tier.

20 Claims, 5 Drawing Sheets

DATA TIERING SYSTEM AND METHOD

TECHNICAL FIELD

This disclosure relates to storage management processes and, more particularly, to storage management processes for use in high-availability storage systems.

BACKGROUND

Storing and safeguarding electronic content is of paramount importance in modern business. Accordingly, various methodologies may be employed to protect and distribute such electronic content, wherein the storage systems that process such content may strive to do so in as an efficient manner as possible.

As storage is transitioning from rotating media (HDD) to solid state (SSD), performance is skyrocketing, as SSD systems are multiple orders of magnitude quicker than HDD systems. Unfortunately, there are downsides, namely substantially increased cost and substantially reduced longevity. Accordingly, a balance has to be struck between performance (which favors SSDs) and cost (which favors HDDs). Accordingly, system may be multi-tiered and include a smaller SSD tier and a larger HDD tier.

SUMMARY OF DISCLOSURE

In one implementation, a computer-implemented method is executed on a computing device and includes: compartmentalizing a SSD storage tier within a storage platform into a plurality of SSD portions including a first SSD portion, a second SSD portion and a third SSD portion; reducing the size of the third SSD portion if the first SSD portion and/or the second SS portion needs to expand; and reducing the size of the second SSD portion if the first SSD portion needs to expand; wherein the storage platform includes an HDD storage tier.

One or more of the following features may be included. The third SSD portion may be eliminated if the first SSD portion needs to further expand and the second SSD portion and the third SSD portion have been reduced to their minimum sizes. The second SSD portion may be eliminated if the first SSD portion needs to further expand and the second SSD portion has been reduced to its minimum size. Cold data stored within the third SSD portion may be identified; and the cold data within the third SSD portion may be relocated to the HDD storage tier. Cold data stored within the second SSD portion may be identified; and the cold data within the second SSD portion may be relocated to the HDD storage tier. New data for storage on the storage platform may be received; and the new data may be defined as one of: mapper metadata, SDNAS metadata and user data. The new data may be stored within the first SSD portion if the new data is mapper metadata. The new data may be stored within the second SSD portion if the new data is SDNAS metadata. The new data may be stored within the third SSD portion if the new data is user data.

In another implementation, a computer program product resides on a computer readable medium and has a plurality of instructions stored on it. When executed by a processor, the instructions cause the processor to perform operations including compartmentalizing a SSD storage tier within a storage platform into a plurality of SSD portions including a first SSD portion, a second SSD portion and a third SSD portion; reducing the size of the third SSD portion if the first SSD portion and/or the second SS portion needs to expand; and reducing the size of the second SSD portion if the first SSD portion needs to expand; wherein the storage platform includes an HDD storage tier.

One or more of the following features may be included. The third SSD portion may be eliminated if the first SSD portion needs to further expand and the second SSD portion and the third SSD portion have been reduced to their minimum sizes. The second SSD portion may be eliminated if the first SSD portion needs to further expand and the second SSD portion has been reduced to its minimum size. Cold data stored within the third SSD portion may be identified; and the cold data within the third SSD portion may be relocated to the HDD storage tier. Cold data stored within the second SSD portion may be identified; and the cold data within the second SSD portion may be relocated to the HDD storage tier. New data for storage on the storage platform may be received; and the new data may be defined as one of: mapper metadata, SDNAS metadata and user data. The new data may be stored within the first SSD portion if the new data is mapper metadata. The new data may be stored within the second SSD portion if the new data is SDNAS metadata. The new data may be stored within the third SSD portion if the new data is user data.

In another implementation, a computing system includes a processor and memory is configured to perform operations including compartmentalizing a SSD storage tier within a storage platform into a plurality of SSD portions including a first SSD portion, a second SSD portion and a third SSD portion; reducing the size of the third SSD portion if the first SSD portion and/or the second SS portion needs to expand; and reducing the size of the second SSD portion if the first SSD portion needs to expand; wherein the storage platform includes an HDD storage tier.

One or more of the following features may be included. The third SSD portion may be eliminated if the first SSD portion needs to further expand and the second SSD portion and the third SSD portion have been reduced to their minimum sizes. The second SSD portion may be eliminated if the first SSD portion needs to further expand and the second SSD portion has been reduced to its minimum size. Cold data stored within a given SSD portion, the given SSD portion including the second SSD portion or the third SSD portion, may be identified; and the cold data within the given SSD portion may be relocated to the HDD storage tier. New data for storage on the storage platform may be received; and the new data may be defined as one of: mapper metadata, SDNAS metadata and user data. The new data may be stored within the first SSD portion if the new data is mapper metadata. The new data may be stored within the second SSD portion if the new data is SDNAS metadata. The new data may be stored within the third SSD portion if the new data is user data.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
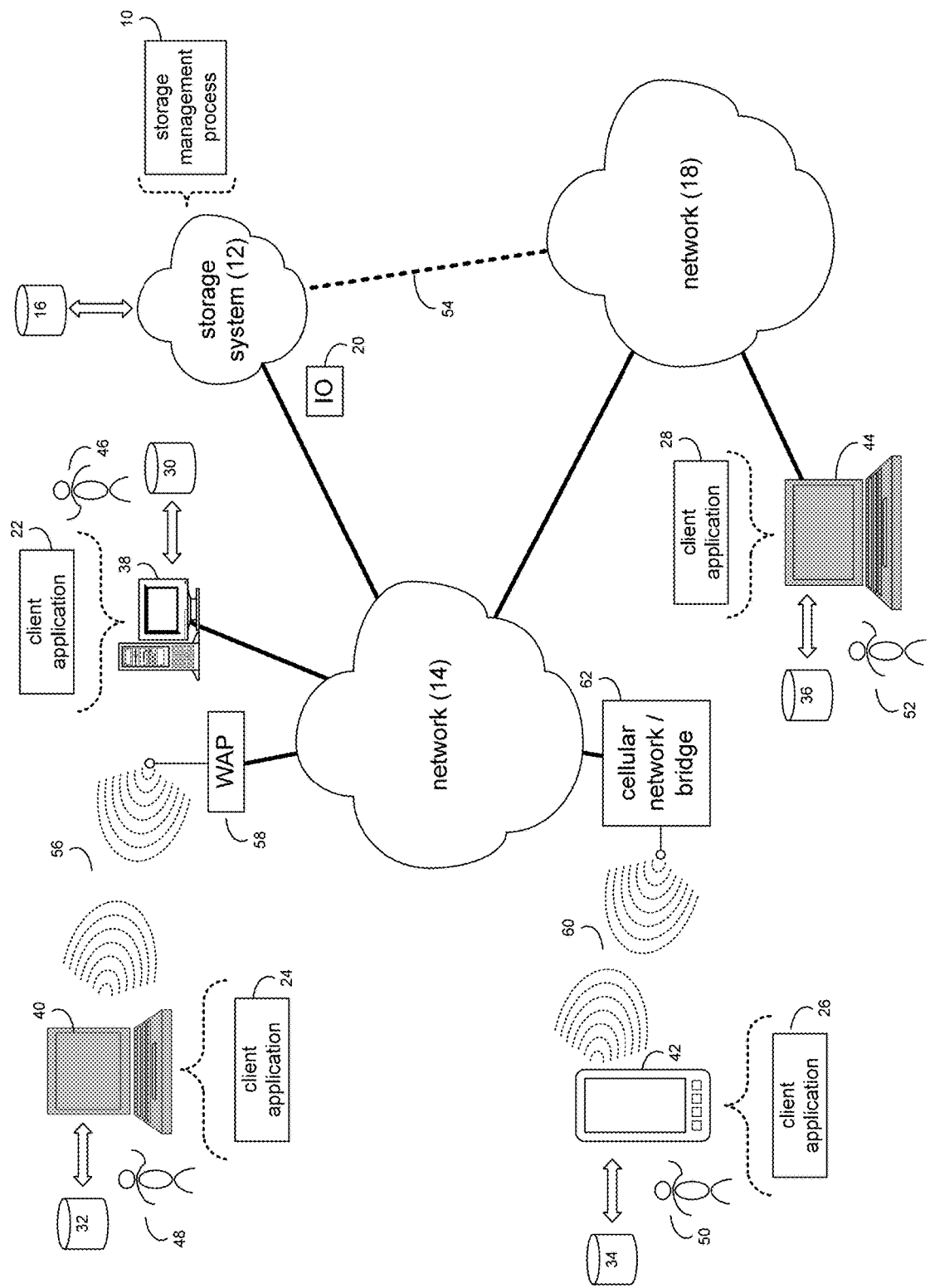
FIG. 1 is a diagrammatic view of a storage system and a storage management process coupled to a distributed computing network.

Referring to FIG. 1, there is shown storage management process 10 that may reside on and may be executed by storage system 12, which may be connected to network 14 (e.g., the Internet or a local area network). Examples of storage system 12 may include, but are not limited to: a personal computer with a memory system, a server computer with a memory system, a Network Attached Storage (NAS) system, a Storage Area Network (SAN) and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™, Unix, or a custom operating system, for example.

The instruction sets and subroutines of storage management process 10, which may be stored on storage device 16 coupled to storage system 12, may be executed by one or more processors (not shown) and one or more memory architectures (not shown) included within storage system 12. Storage device 16 may include but is not limited to: a hard disk drive; an optical drive; a RAID device; a random-access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g., IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices (e.g., client electronic devices 38, 40, 42, 44) may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows t in, Apple Macintosh™, Redhat Linux™, or a custom operating system.

Figure 2:
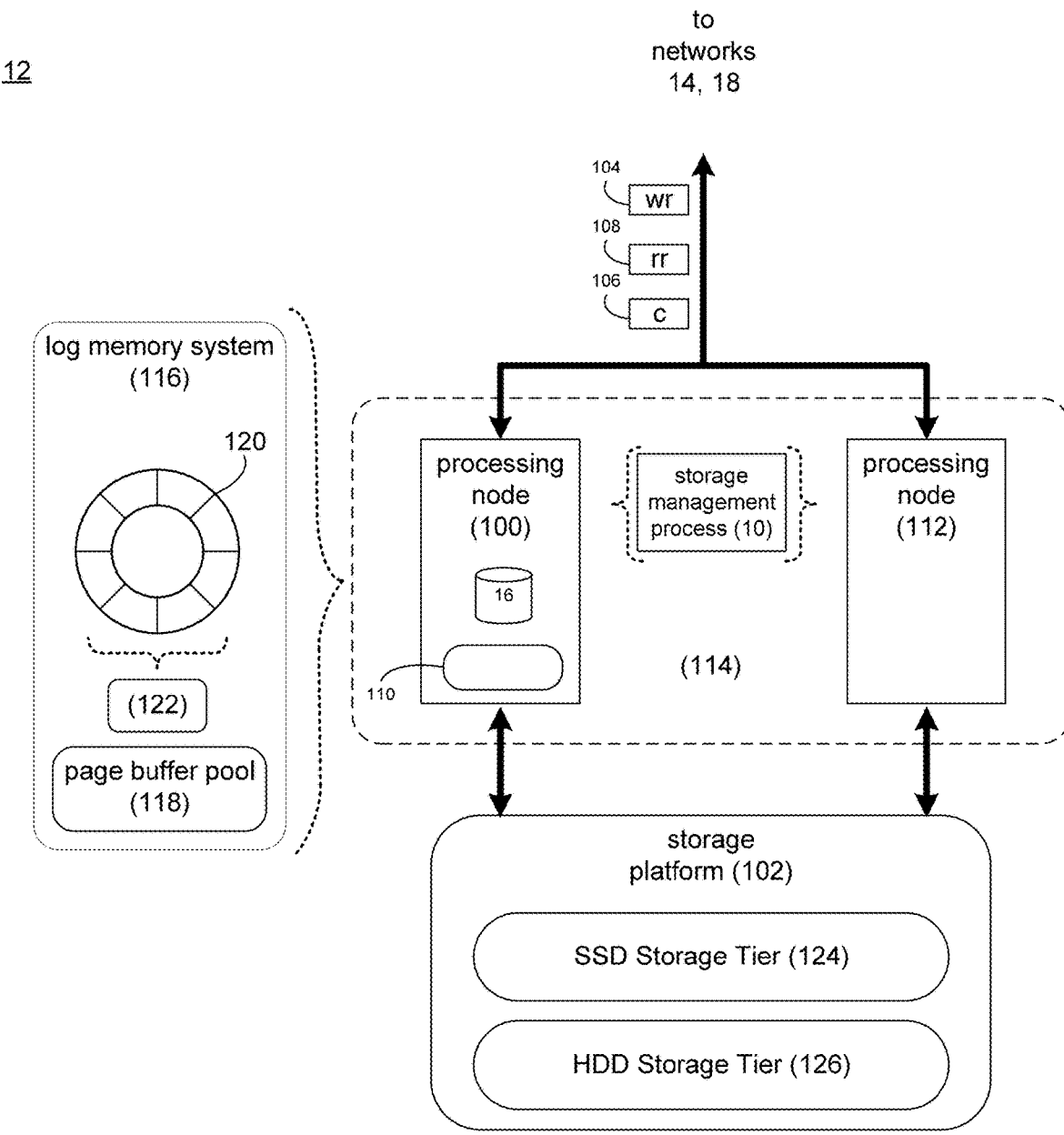
FIG. 2 is a diagrammatic view of the storage system of FIG. 1.

The Data Storage System:

Referring also to FIG. 2, there is shown a general implementation of storage system 12. In this general implementation, storage system 12 may include processing node 100, wherein processing node 100 may be configured to perform computational tasks and to store data within storage platform 102.

Depending upon the manner in which storage system 12 is configured, storage platform 102 may include a single storage device (such as a single hard disk drive or a single solid state storage device) or may include a plurality of storage devices that are configured to provide various levels of performance and/or high availability. For example and if storage platform 102 includes a plurality of storage devices (e.g., hard disk drives and/or solid state storage devices), this plurality of storage devices may be configured to form a RAID storage array utilizing various standard RAID structures (e.g., RAID 0, RAID 1, RAID 3, RAID 5, RAID 6, RAID 7 or RAID 10), thus providing a higher level of performance and/or availability. Further, storage platform 102 may be a cloud-based storage platform that provides virtualized storage functionality to (in this example) users 46, 48, 50, 52.

As is known in the art, cloud storage is a model of computer data storage in which the digital data is stored in logical pools, said to be on "the cloud". The physical storage spans multiple servers (sometimes in multiple locations) and the physical environment is typically owned and managed by a hosting company. These cloud storage providers are responsible for keeping the data available and accessible, and the physical environment secured, protected, and running. People and organizations buy or lease storage capacity from the providers to store user, organization, or application data. Cloud storage services may be accessed through a collocated cloud computing service, a web service application programming interface (API) or by applications that use the API, such as cloud desktop storage, a cloud storage gateway or Web-based content management systems.

Storage system 12 may be configured to execute all or a portion of storage management process 10. The instruction sets and subroutines of storage management process 10, which may be stored on a storage device (e.g., storage device 16) coupled to e.g., processing node 100, may be executed by one or more processors (not shown) and one or more memory architectures (not shown) included within processing node 100. Storage device 16 may include but is not limited to: a hard disk drive; a RAID device; a random-access memory (RAM); a read-only memory (ROM); and all forms of flash memory storage devices.

As discussed above, various IO requests (e.g., IO request 20) may be generated. For example, these IO requests may be sent from client applications 22, 24, 26, 28 to storage system 12. Additionally/alternatively and when storage system 12 is configured as an application server, these IO requests may be internally generated within storage system 12. Examples of IO request 20 may include but are not limited to data write request 104 (i.e., a request that content 106 be written to storage system 12) and data read request 108 (i.e., a request that content 106 be read from storage system 12).

During operation of processing node 100, content 106 to be written to storage system 12 may be processed by processing node 100. Additionally/alternatively and when storage system 12 is configured as an application server, content 106 to be written to storage system 12 may be internally generated by processing node 100.

Processing node 100 may include cache memory system 110. Examples of cache memory system 110 may include but are not limited to a volatile, solid-state, cache memory system (e.g., a static RAM cache memory system) and/or a non-volatile, solid-state, cache memory system (e.g., a flash-based, cache memory system). Processing node 100 may initially store content 106 within cache memory system 110. Depending upon the manner in which cache memory system 110 is configured, processing node 100 may immediately write content 106 to storage platform 102 (if cache memory system 110 is configured as a write-through cache) or may subsequently write content 106 to storage platform 102 (if cache memory system 110 is configured as a write-back cache).

Storage system 12 may be configured to include a plurality of processing nodes, each of which may be configured to receive, generate and/or process content (e.g., content 106). For example and in addition to processing node 100, storage system 12 may include one or more additional processing nodes (e.g., processing node 112).

In some implementations, storage system 12 may include multi-node active-active storage clusters configured to provide high availability to a user. As is known in the art, the term "high availability" may generally refer to systems or components that are durable and likely to operate continuously without failure for a long time. For example, an active-active storage cluster (e.g., computing cluster 114) may be formed from at least two nodes (e.g., processing nodes 100, 112), both actively running the same kind of service(s) simultaneously. One purpose of an active-active cluster (e.g., computing cluster 114) may be to achieve load balancing. Load balancing may distribute workloads across all nodes in order to prevent any single node from getting overloaded. Because there are more nodes available to serve, there will also be a marked improvement in throughput and response times. Another purpose of an active-active cluster (e.g., computing cluster 114) may be to provide at least one active node in the event that one of the nodes in the active-active cluster fails.

Log-Based Storage System:

Storage system 12 may be configured as a log-based storage system. If so configured, storage management process 10 may store received data in a log memory system (e.g., log memory system 116). As is known in the art, a log memory system (e.g., log memory system 116) may generally include one or more non-volatile random-access memory (NVRAM) devices configured to store a log of the data written to storage system 12.

As discussed above, an example of IO request 20 may include but is not limited to data write request 104 (i.e., a request that content 106 be written to storage system 12). Further and as discussed above, upon receiving data write request 104 and content 106, data write request 104 and content 106 may be written to cache memory system 110 (which may be volatile). However and when configured as a log-based storage system, upon receiving data write request 104 and content 106, data write request 104 and/or content 106 may also be written to log memory system 116 (which is persistent).

Therefore and through the use of log memory system 116, the content of cache memory system 110 (e.g., data write request 104 and content 106) may be recovered (via log memory system 116) in the event of a power failure and/or a failure of cache memory system 110. Further and due to such failure recoverability, data (e.g., content 106) may be considered to be persistently stored (i.e., as if stored in storage platform 102) once such data (e.g., content 106) is saved within log memory system 116. Therefore, once such data (e.g., content 106) is saved within log memory system 116, a write acknowledgement may be provided to the sender of data write request 104, acknowledging the successful saving of such data (e.g., content 106), wherein such data (e.g., content 106) may be subsequently written to storage platform 102.

Log memory system 116 may include a page buffer pool (e.g., page buffer pool 118) and/or a page descriptor ring buffer (e.g., page descriptor ring buffer 120) to effectuate the above-described temporary storage of (in this example) content 106. For example, storage management process 10 may store one or more pages (associated with content 106) in one or more page buffers within page buffer pool 118 based, at least in part, upon the processing of (in this example) write request 104. Further, storage management process 10 may store information concerning the data (e.g., content 106) stored within log memory system 116 in a page descriptor (e.g., page descriptor 122), wherein page descriptor 122 may generally include a reference (i.e., a pointer) to the related page buffer(s) within page buffer pool 118. Page descriptor 122 may also include a sequence transaction number that tracks the order of write operations and/or other types of information.

Storage management process 10 may store each page descriptor (e.g., page descriptor 122) in a page descriptor ring buffer (e.g., page descriptor ring buffer 120). As is known in the art, a page descriptor ring buffer may allow data to be added to the "head" of the page descriptor ring buffer and released or overwritten from the tail of the page descriptor ring buffer. Accordingly, page descriptor ring buffer 120 may appear to be circular in that older data is overwritten with newer data as data (e.g., content 106) is moved from page buffer pool 118 to storage platform 102.

As discussed above, storage systems (e.g., storage system 12) have been transitioning from rotating media (e.g., hard disk drives) to solid state media (e.g., solid state devices), resulting in greatly enhanced performance. Unfortunately, such solid-state media is substantially more expensive. Accordingly, storage systems (e.g., storage system 12) may utilize both types of media (e.g., hard disk drives and solid-state devices) to provide a high level of performance at an acceptable price point. Specifically, storage platform 102 within storage system 12 may be a multi-tier storage platform that includes multiple storage tiers of different storage types. For example, storage platform 102 within storage system 12 may include an SSD storage tier (e.g., SSD storage tier 124) and an HDD storage tier (e.g., HDD storage tier 126).

Figure 3:
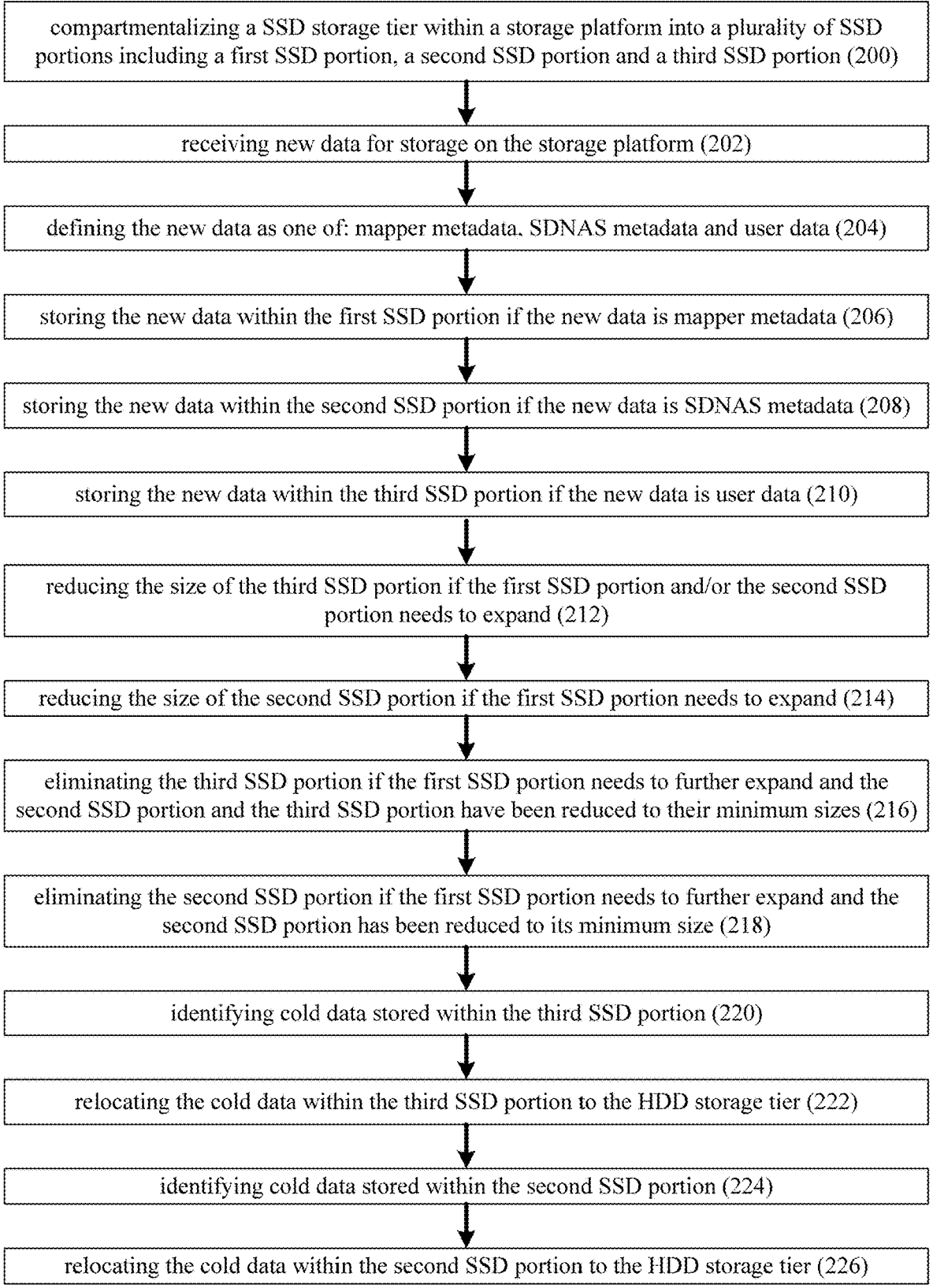
FIG. 3 is a flow chart of the storage management process of FIG. 1.
Figure 4:
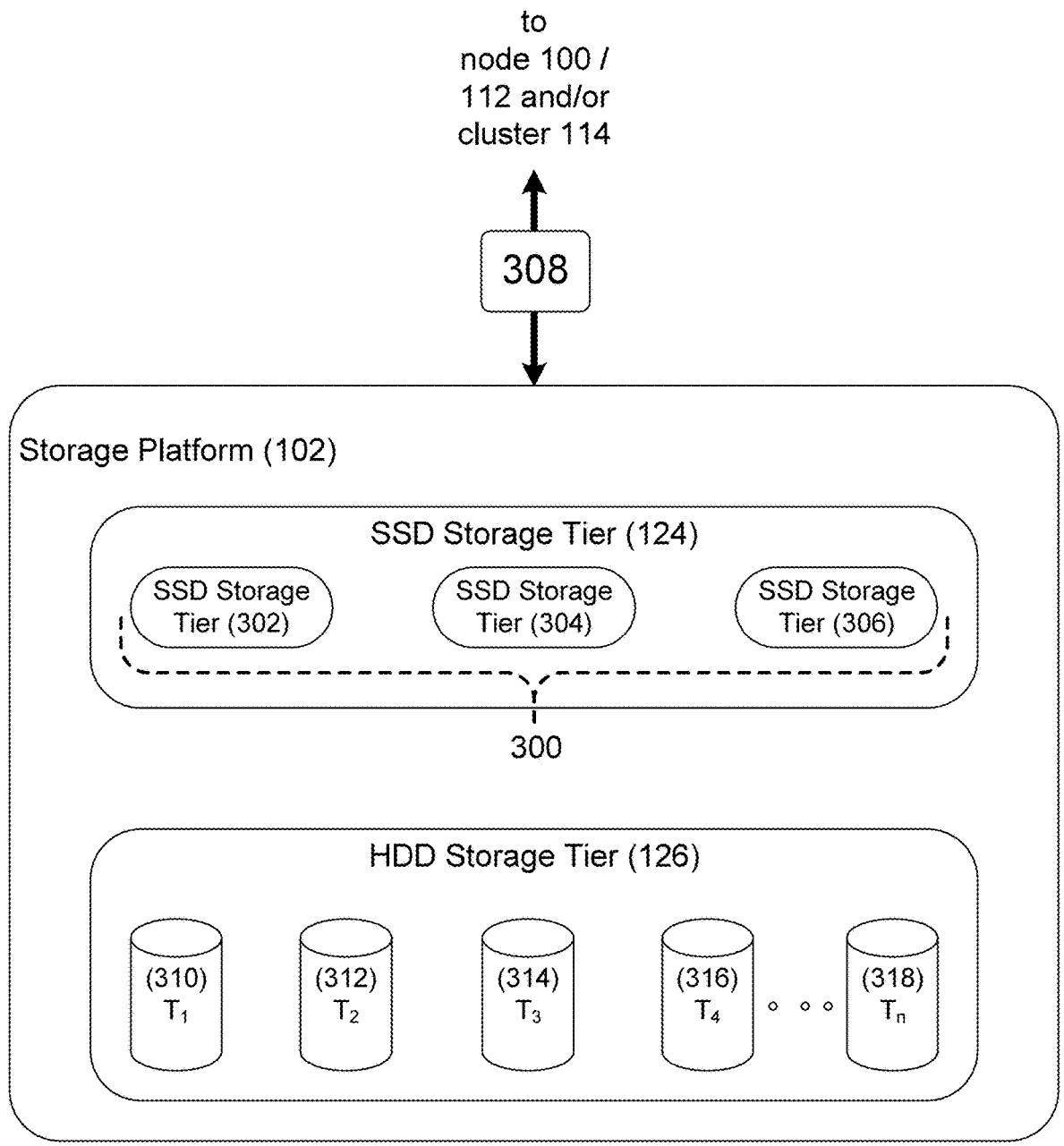
FIG. 4 is another diagrammatic view of the storage system of FIG. 1.

Storage Management Process:

Referring also to FIGS. 3-4, storage management process 10 may compartmentalize 200 an SSD storage tier (e.g., SSD storage tier 124) within a storage platform (e.g., storage platform 102) into a plurality of SSD portions (e.g., plurality of SSD portions 300) including a first SSD portion (e.g., first SSD portion 302), a second SSD portion (e.g., second SSD portion 304) and a third SSD portion (e.g., third SSD portion 306). While in this example, plurality of SSD portions 300 is shown to include three SSD portions (i.e., SSD portions 302, 304, 306), this is for illustrative purposes only and is not intended to be a limitation of this disclosure, as other configurations are possible and are considered to be within the scope of this disclosure. For example, the numbers of SSD portions may be increased/decreased depending upon design criteria/performance requirements.

During the operation of storage system 12, data (e.g., data 308) may be written to storage platform 102 after being received from processing node 100, processing node 112 and/or computing cluster 114. As discussed above, the storage system (e.g., storage system 12) may be a log-based storage system that includes log memory system 116 having one or more non-volatile random-access memory (NVRAM) devices configured to store a log of the data written to storage system 12. Accordingly and during operation of such a log-based system, this data (e.g., data 308) is routinely "flushed" from log memory system 116 to storage platform 102. Upon arriving at storage platform 102, this data (e.g., data 308) may be stored within the SSD storage tier (e.g., SSD storage tier 124) and/or the HDD storage tier (e.g., HDD storage tier 126)

HDD storage tier 126 may include a plurality of storage targets $T_{1-n}$ (e.g. storage targets 310, 312, 314, 316, 318). Storage targets 310, 312, 314, 316, 318 may be configured to provide various levels of performance and/or high availability. For example, one or more of storage targets 310, 312, 314, 316, 318 may be configured as a RAID 0 array, in which data is striped across storage targets. By striping data across a plurality of storage targets, improved performance may be realized. However, RAID 0 arrays do not provide a level of high availability. Accordingly, one or more of storage targets 310, 312, 314, 316, 318 may be configured as a RAID 1 array, in which data is mirrored between storage targets. By mirroring data between storage targets, a level of high availability is achieved as multiple copies of the data are stored within storage system 12.

While storage targets 310, 312, 314, 316, 318 are discussed above as being configured in a RAID 0 or RAID 1 array, this is for illustrative purposes only and is not intended to be a limitation of this disclosure, as other configurations are possible. For example, storage targets 310, 312, 314, 316, 318 may be configured as a RAID 3, RAID 4, RAID 5 or RAID 6 array. While in this particular example, HDD storage tier 126 is shown to include five storage targets (e.g. storage targets 310, 312, 314, 316, 318), this is for illustrative purposes only and is not intended to be a limitation of this disclosure. Specifically, the actual number of storage targets may be increased or decreased depending upon e.g. the level of redundancy/performance/capacity required.

As discussed above, during the operation of storage system 12, storage management process 10 may receive 202 new data (e.g., data 308) for storage on the storage platform (e.g., storage system 12). Upon receiving 202 such data (e.g., data 308), storage management process 10 may define 204 the new data (e.g., data 308) as one of: mapper metadata, SDNAS metadata and user data.

As is known in the art:
Mapper Metadata: This is metadata that maps (e.g., via pointers) the translation between the logical storage space (e.g., Virtual Large Blocks) and the physical storage space (e.g., Physical Large Blocks)
SDNAS Metadata: This is metadata that maps (e.g., via pointers) the file storage layer to the block storage layer for use with SDNAS (i.e., Software Defined Network Attached Storage).
User Data: This is generally speaking the user data itself, as opposed to the metadata that defines the locations of this user data.

As is known in the art, metadata is "data that provides information about other data", but not the content of the data, such as the text of a message or the image itself. Upon defining 204 the new data (e.g., data 308) as one of: mapper metadata, SDNAS metadata and user data, storage management process 10 may:
store 206 the new data (e.g., data 308) within the first SSD portion (e.g., first SSD portion 302) if the new data (e.g., data 308) is mapper metadata (as described above);
store 208 the new data (e.g., data 308) within the second SSD portion (e.g., second SSD portion 304) if the new data (e.g., data 308) is SDNAS metadata (as described above); and
store 210 the new data (e.g., data 308) within the third SSD portion (e.g., third SSD portion 306) if the new data (e.g., data 308) is user data (as described above).

During the operation of storage system 12, data (e.g., data 308) written to storage platform 102 may begin to fill the SSD storage tier (e.g., SSD storage tier 124) and the plurality of SSD portions (e.g., plurality of SSD portions 300) contained therein.

Generally speaking:
Mapper Metadata: This metadata may continue to grow in size as storage system 12 continues to operate. Accordingly, it is foreseeable that mapper metadata may eventually utilize/consume all of SSD storage tier 124. Further and for performance reasons, mapper metadata must remain within SSD storage tier 124, as opposed to being moved (i.e., down-tiered) to HDD tier 126.
SDNAS Metadata: This metadata may also continue to grow in size as storage system 12 continues to operate. However and unlike mapper metadata, SDNAS metadata may be down-tiered to HDD tier 126. However, keeping SDNAS metadata within SSD storage tier 124 should be prioritized over user data.
User Data: This data may also continue to grow in size as storage system 12 continues to operate. However and unlike mapper metadata, user data may be down-tiered to HDD tier 126. As keeping SDNAS metadata within SSD storage tier 124 is prioritized over user data, user data is often the first to be down-tiered.

For this example, assume that SSD storage tier 124 is configured as follows:
Storage Platform 102: Assume that the total capacity of storage platform 102 is 30.00 TB.
SSD storage tier 124: SSD storage tier 124 may be a defined percentage of the capacity of storage platform 102 based upon the anticipated quantity of mapper metadata (as mapper metadata cannot be down-tiered). Assume that it is anticipated that mapper metadata will be 15% of the total data stored within storage platform 102. Accordingly and to provide for a buffer, SSD storage tier 124 may be 20% of the total capacity of storage platform 102 (namely 6.00 TB).

SSD Portions: SSD storage tier 124 may be divided into three SSD portions: first SSD portion 302, second SSD portion 304 and third SSD portion 306, each having an initial size of 2.00 TB. While in this example, these three SSD portions (e.g., SSD portions 302. 304. 306) have an equal initial size, this is for illustrative purposes only and is not intended to be a limitation of this disclosure, as other configurations are possible and are considered to be within the scope of this disclosure.

Figure 5:
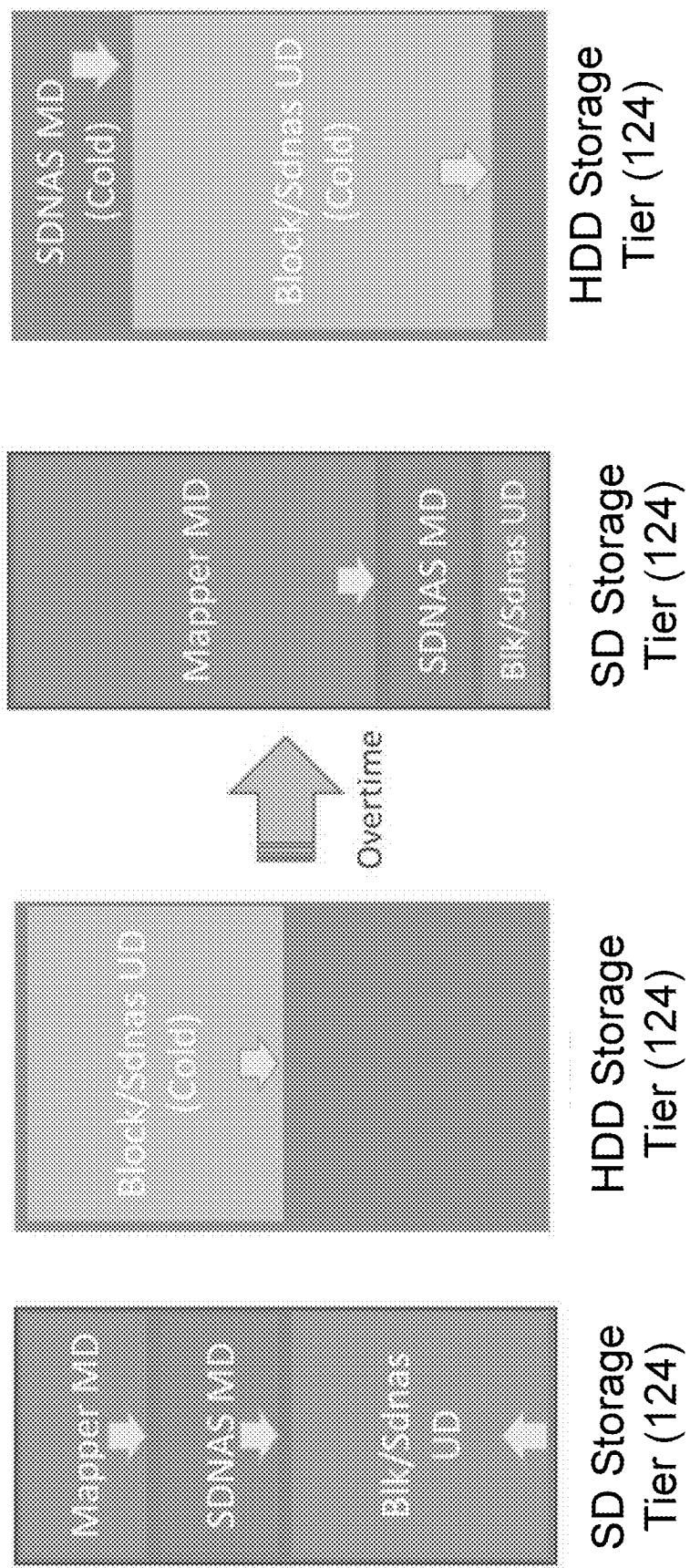
FIG. 5 is another diagrammatic view of the storage system of FIG. 1.

As discussed above, mapper metadata (within first SSD portion 302) may continue to grow in size as storage system 12 continues to operate. Additionally, SDNAS metadata (within second SSD portion 304) may continue to grow (as shown in FIG. 5). Accordingly and in order to make room for such an increase in metadata within SSD portions 302, 304, storage management process 10 may reduce 212 the size of the third SSD portion (e.g., third SSD portion 306) if the first SSD portion (e.g., first SSD portion 302) and/or the second SSD portion (e.g., second SSD portion 304) needs to expand.

For example, if mapper metadata (within first SSD portion 302) needs to expand by 0.50 TB and SDNAS metadata (within second SSD portion 304) needs to expand by 0.50 TB, storage management process 10 may reduce 212 the size of third SSD portion 306 from its initial size of 2.00 TB to 1.00 TB to allow for the expansion of first SSD portion 302 and second SSD portion 304. This reduction of the size may continue until third SSD portion 306 reaches its minimum size, such as a static amount (e.g., 100.00 GB) or a defined percentage (e.g., 5%).

Once third SSD portion 306 is reduced to its minimum size (e.g., 100.00 GB), storage management process 10 may reduce 214 the size of the second SSD portion (e.g., second SSD portion 304) if the first SSD portion (e.g., first SSD portion 302) needs to again expand.

For example, if mapper metadata (within first SSD portion 302) needs to expand 1.00 TB, storage management process 10 may reduce 214 the size of second SSD portion 304 from its current size of 2.50 TB to 1.50 TB to allow for the expansion of first SSD portion 302. This reduction of the size may continue until second SSD portion 304 reaches its minimum size, such as a static amount (e.g., 100.00 GB) or a defined percentage (e.g., 5%).

Assume that, mapper metadata (within first SSD portion 302) continues to grow in size as storage system 12 continues to operate. Accordingly, storage management process 10 may eliminate 216 the third SSD portion (e.g., third SSD portion 306) if the first SSD portion (e.g., first SSD portion 302) needs to further expand and the second SSD portion (e.g., second SSD portion 304) and the third SSD portion (e.g., third SSD portion 306) have been reduced to their minimum sizes (e.g., 100.00 GB each).

If mapper metadata (within first SSD portion 302) continues to grow in size, storage management process 10 may eliminate 218 the second SSD portion (e.g., second SSD portion 304) if the first SSD portion (e.g., first SSD portion 302) needs to further expand and the second SSD portion (e.g., second SSD portion 304) has been reduced to its minimum size (e.g., 100.00 GB).

Moving Data Between Tiers

Storage management process 10 may monitor the utilization level of SSD storage tier 124 to determine whether some data within SSD storage tier 124 may be down-tiered to HDD storage tier 126. For example, storage management process 10 may individually monitor the utilization levels of second SSD portion 304 and third SSD portion 306 to determine if either of SSD portions 304, 306 is at a utilization level of e.g., 85% or greater. If so, storage management process 10 may determine whether some data within either of SSD portions 304, 306 may be down-tiered to HDD storage tier 126. Storage management process 10 may not monitor the utilization level of first SSD portion 304 since mapper metadata should remain in SSD storage tier 124 and, therefore, cannot be down-tiered.

Accordingly, storage management process 10 may identify 220 cold data stored within the third SSD portion (e.g., third SSD portion 306) and may relocate 222 the cold data within the third SSD portion (e.g., third SSD portion 306) to the HDD storage tier (e.g., HDD storage tier 126). Further, storage management process 10 may identify 224 cold data stored within the second SSD portion (e.g., second SSD portion 304) and may relocate 226 the cold data within the second SSD portion (e.g., second SSD portion 304) to the HDD storage tier (e.g., HDD storage tier 126).

As is known in the art, cold data refers to data that is rarely accessed, therefore considered "cold". Cold data is the opposite of hot data, which is data that is frequently accessed. To optimize storage costs, cold data may be stored on lower performing and less expensive storage media. For example, solid state disks may be used for storing hot data, while cold data can be moved to hard drives, optical discs, tapes or migrated to cloud storage.

Storage management process 10 may utilize various methodologies to identify which data (within third SSD portion 306 and/or second SSD portion 304) is hot, cold or warm. Generally speaking, the temperature of data may be examined one VLB (virtual large block) at a time . . . wherein up to eight VLBs may be mapped to a single PLB (physical large block). Accordingly, a single PLB may contain a mixture of hot data, warm data and cold data.

Hot Data is typically classified as data that is "write hot" (i.e., data that was recently written), which includes data that is both "write hot" and "read hot" (i.e., data that was recently read). When the data is Hot Data, storage management process 10 may generally do nothing and may allow the Hot Data to stay on SSD storage tier 124 and the PLB to further self-clean.

Warm Data is typically classified as data that is "Write Cold/Warm" (i.e., data that was not recently written) and Read Hot/Warm (i.e., data that was recently read). When the data is Warm Data, storage management process 10 may perform a garbage collection operation. As is known in the art, garbage collection is a form of automatic memory management. The garbage collection operation attempts to reclaim memory which was allocated by the program, but is no longer referenced.

Cold Data is typically classified as data that is "write cold" (i.e., data that was not recently written) and "read cold" (i.e., data that was not recently read). When the data is Cold Data, storage management process 10 may down-tier to HDD storage tier 126.

When determining the temperature of data, storage management process 10 may examine one or more active tablets/analytical tablets (not shown) associated with various cores (not shown) within microprocessors (not shown) included within storage system 12. Specifically, these active tablets/analytical tablets (not shown) may log the amount of times that a particular core (not shown) within a particular microprocessor (not shown) access a VLB, thus allowing storage management process 10 to determine the "heat" of data.

When relocating 222 the cold data within the third SSD portion (e.g., third SSD portion 306) to the HDD storage tier (e.g., HDD storage tier 126) and/or relocating 226 the cold data within the second SSD portion (e.g., second SSD portion 304) to the HDD storage tier (e.g., HDD storage tier 126), storage management process 10 may perform various operations, such as:

Garbage Collection without Down-Tiering: where e.g., "n" SSD PLBs within SSD storage tier 124 are combined to form one SSD PLB within SSD storage tier 124.

Garbage Collection with Down-Tiering: where "n" SSD PLBs within SSD storage tier 124 are combined to form one HDD PLB within HDD storage tier 126.

Down-Tiering: where a partially filled SSD PLB within SSD storage tier 124 is relocated to HDD storage tier 126, thus freeing up an SSD PLB within SSD storage tier 124.

While storage system 12 is discussed above as if all data (e.g., data 308) is typically initially written to SSD storage tier (e.g., SSD storage tier 124), there are situations in which data (e.g., data 308) may be written directly to HDD storage tier 126. Examples of such situations may include but are not limited to:

SSD Bandwidth Considerations: If the SSD storage tier (e.g., SSD storage tier 124) is approaching its bandwidth quota (e.g., is approaching the maximum throughput for data storage), the data (e.g., data 308) may be written directly to HDD storage tier 126.

SSD Wear: If the SSD storage tier (e.g., SSD storage tier 124) is experiencing a high level of wear (e.g., write operations are occurring at a rate greater than the budgeted rate), the data (e.g., data 308) may be written directly to HDD storage tier 126.

Retention Time: If the data is going to be cycled out of the SSD storage tier (e.g., SSD storage tier 124) and into the HDD storage tier (e.g., HDD storage tier 126) in a comparatively short period of time (e.g., within several seconds or minutes), the data (e.g., data 308) may be written directly to HDD storage tier 126.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method executed on a computing device comprising:
compartmentalizing a SSD storage tier within a storage platform into a plurality of SSD portions including a first SSD portion, a second SSD portion and a third SSD portion;
reducing the size of the third SSD portion if the first SSD portion and/or the second SSD portion needs to expand; and
reducing the size of the second SSD portion if the first SSD portion needs to expand;
wherein the storage platform includes an HDD storage tier.

2. The computer-implemented method of claim 1 further comprising:
eliminating the third SSD portion if the first SSD portion needs to further expand and the second SSD portion and the third SSD portion have been reduced to their minimum sizes.

3. The computer-implemented method of claim 2 further comprising:
eliminating the second SSD portion if the first SSD portion needs to further expand and the second SSD portion has been reduced to its minimum size.

4. The computer-implemented method of claim 1 further comprising:
identifying cold data stored within the third SSD portion; and
relocating the cold data within the third SSD portion to the HDD storage tier.

5. The computer-implemented method of claim 1 further comprising:
identifying cold data stored within the second SSD portion; and
relocating the cold data within the second SSD portion to the HDD storage tier.

6. The computer-implemented method of claim 1 further comprising:
receiving new data for storage on the storage platform; and
defining the new data as one of: mapper metadata, SDNAS metadata and user data.

7. The computer-implemented method of claim 6 further comprising:
storing the new data within the first SSD portion if the new data is mapper metadata;
storing the new data within the second SSD portion if the new data is SDNAS metadata; and
storing the new data within the third SSD portion if the new data is user data.

8. A non-transitory computer program product residing on a computer readable medium having a plurality of instructions stored thereon which, when executed by a processor, cause the processor to perform operations comprising: compartmentalizing a SSD storage tier within a storage platform into a plurality of SSD portions including a first SSD portion, a second SSD portion and a third SSD portion;
reducing the size of the third SSD portion if the first SSD portion and/or the second SSD portion needs to expand; and
reducing the size of the second SSD portion if the first SSD portion needs to expand; wherein the storage platform includes an HDD storage tier.

9. The non-transitory computer program product of claim 8 further comprising:
eliminating the third SSD portion if the first SSD portion needs to further expand and the second SSD portion and the third SSD portion have been reduced to their minimum sizes.

10. The non-transitory computer program product of claim 9 further comprising:
eliminating the second SSD portion if the first SSD portion needs to further expand and the second SSD portion has been reduced to its minimum size.

11. The non-transitory computer program product of claim 8 further comprising:
identifying cold data stored within the third SSD portion; and relocating the cold data within the third SSD portion to the HDD storage tier.

12. The non-transitory computer program product of claim 8 further comprising:
identifying cold data stored within the second SSD portion; and relocating the cold data within the second SSD portion to the HDD storage tier.

13. The non-transitory computer program product of claim 8 further comprising:
receiving new data for storage on the storage platform; and defining the new data as one of:
mapper metadata, SDNAS metadata and user data.

14. The non-transitory computer program product of claim 13 further comprising: storing the new data within the first SSD portion if the new data is mapper metadata; storing the new data within the second SSD portion if the new data is SDNAS metadata; and storing the new data within the third SSD portion if the new data is user data.

15. A computing system including a processor and memory configured to perform operations comprising:
compartmentalizing a SSD storage tier within a storage platform into a plurality of SSD portions including a first SSD portion, a second SSD portion and a third SSD portion;
reducing the size of the third SSD portion if the first SSD portion and/or the second SSD portion needs to expand; and
reducing the size of the second SSD portion if the first SSD portion needs to expand;
wherein the storage platform includes an HDD storage tier.

16. The computing system of claim 15 further comprising:
eliminating the third SSD portion if the first SSD portion needs to further expand and the second SSD portion and the third SSD portion have been reduced to their minimum sizes.

17. The computing system of claim 16 further comprising:
eliminating the second SSD portion if the first SSD portion needs to further expand and the second SSD portion has been reduced to its minimum size.

18. The computing system of claim 15 further comprising:
identifying cold data stored within a given SSD portion, the given SSD portion including the second SSD portion or the third SSD portion; and
relocating the cold data within the given SSD portion to the HDD storage tier.

19. The computing system of claim 15 further comprising:
receiving new data for storage on the storage platform; and
defining the new data as one of: mapper metadata, SDNAS metadata and user data.

20. The computing system of claim 19 further comprising:
storing the new data within the first SSD portion if the new data is mapper metadata;
storing the new data within the second SSD portion if the new data is SDNAS metadata; and
storing the new data within the third SSD portion if the new data is user data.

* * * * *